United States Patent [19]
Corriveau et al.

[11] Patent Number: 5,911,122
[45] Date of Patent: Jun. 8, 1999

[54] INTER-EXCHANGE PASSING OF HAND-OFF RELATED PARAMETERS

[75] Inventors: Michel Corriveau, St-Hubert; Michel Houde, St Laurent, both of Canada

[73] Assignee: Telefonaktiebolaget LM Ericsson, Stockholm, Sweden

[21] Appl. No.: 08/724,693

[22] Filed: Oct. 1, 1996

[51] Int. Cl.⁶ .................................................. H04Q 7/22
[52] U.S. Cl. .......................................... 455/432; 455/436
[58] Field of Search .................................. 455/432, 433, 455/436, 440; 370/332

[56] References Cited

U.S. PATENT DOCUMENTS

| | | | |
|---|---|---|---|
| 5,408,419 | 4/1995 | Wong | 455/433 |
| 5,682,416 | 10/1997 | Schmidt et al. | 455/436 |
| 5,697,055 | 12/1997 | Gilhousen et al. | 455/436 |

*Primary Examiner*—Andrew M. Dollnar
*Attorney, Agent, or Firm*—Jenkens & Gilchrist

[57] ABSTRACT

In connection with instances of inter-exchange hand-off, certain hand-off related parameters assigned to border cells within a first system area are evaluated and considered by the second system area in making the inter-exchange hand-off. To communicate these hand-off related parameters from the first system area to the second system area, a request for the parameters is transmitted from a mobile switching center serving the second system area to a mobile switching center serving the first system area. Responsive thereto, the mobile switching center for the first system area retrieves and delivers the requested parameters for subsequent second system area mobile switching center processing in connection with making the inter-exchange hand-off determination. Alternatively, the mobile switching center serving the first system area acts on its own to retrieve and send certain hand-off related parameters to the mobile switching center serving the second system area for subsequent use in connection with making the inter-exchange hand-off determination.

9 Claims, 4 Drawing Sheets

INTER-EXCHANGE PASSING OF HAND-OFF RELATED PARAMETERS

BACKGROUND OF THE INVENTION

1. Technical Field of the Invention

The present invention relates to cellular telephone networks and, in particular, to the communication between exchanges of handoff related parameters concerning border cells.

2. Description of Related Art

In the context of inter-exchange hand-off, certain hand-off related parameters, namely the minimum signal strength required for hand-off to a cell (SSMIN), maximum allowed base station power setting (PSVB), power setting used on measurement channel (PSMB), and maximum power level at voice channel (PLVM), which are set by system operators for each cell within a given system area, must also be provided to the system operators of neighboring system areas for processing use in connection with the making of inter-exchange hand-off evaluations and determinations. Historically, these parameters have been provided to other system operators for manual input into the exchanges of their networks. Improper or incorrect manual entry of these parameters often occurs. Furthermore, updates of these parameters may not be communicated to other system operators following an initial configuration of the cellular network. In each of these cases, incorrect inter-exchange hand-off evaluations and determinations may occur due to the use of incorrect hand-off related parameters. A more efficient, accurate and trustworthy method is thus needed for passing these parameters between system operators and, in particular, between exchanges serving system area border cells.

SUMMARY OF THE INVENTION

To address the foregoing need, and other needs, an automated passing of hand-off related parameters between the exchanges of neighboring system areas is effectuated. In accordance with a first embodiment, the hand-off related parameters are passed from a mobile switching center at the request of another, neighboring mobile switching center. In a second embodiment, the hand-off related parameters are passed to a mobile switching center at the directive of another mobile switching center. In either case, an appropriate message relating to the conveyance of the hand-off related parameters is generated by a first mobile switching center for transmission to a second mobile switching center. Once supplied to the second mobile switching center, the hand-off related parameters are used therein during the evaluation and determination of inter-exchange hand-offs.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
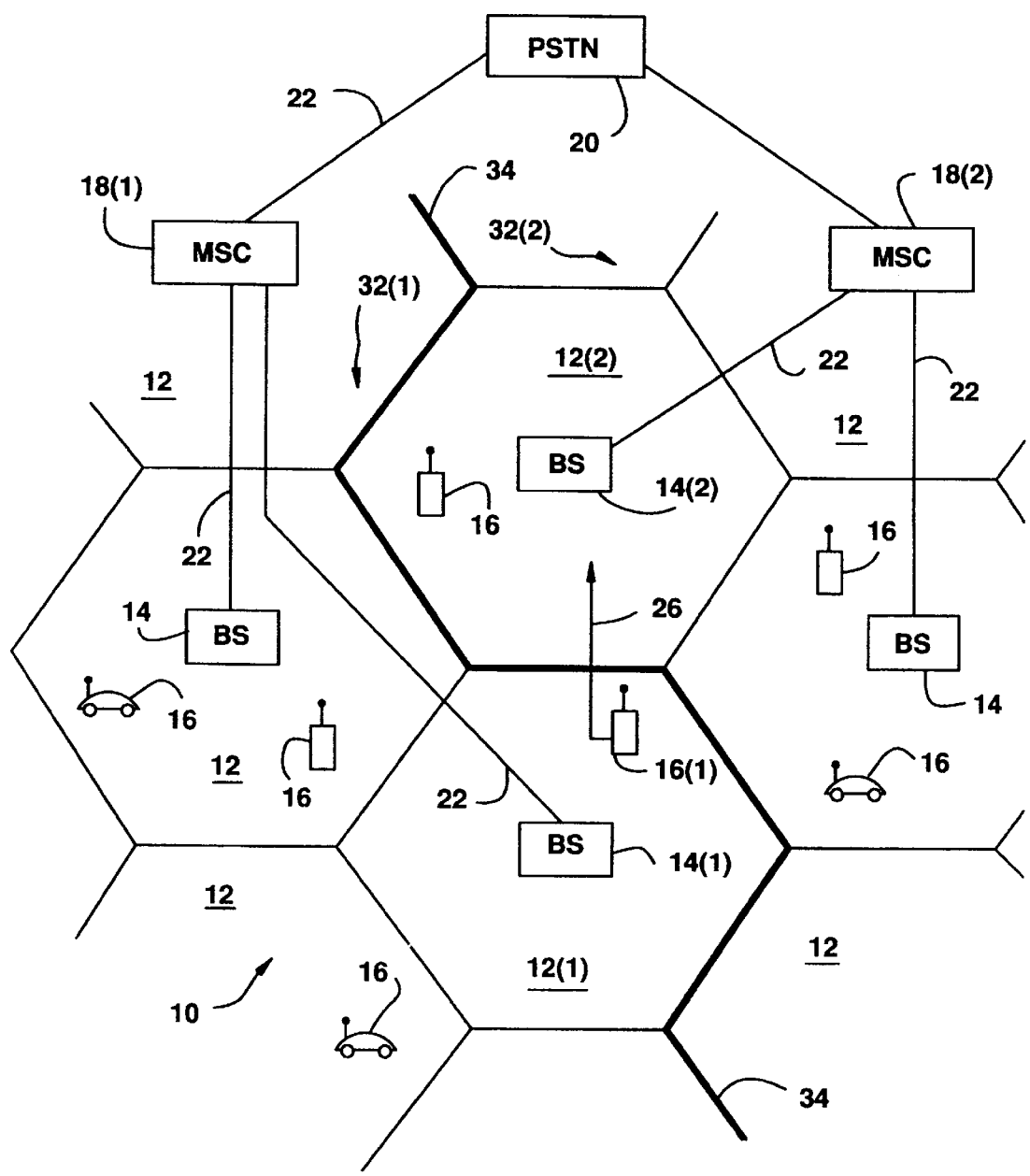
FIG. 1 is a cell diagram illustrating an exemplary cell configuration for a cellular telephone network in which the present invention may be implemented.

Reference is now made to FIG. 1 wherein there is shown a cell diagram illustrating an exemplary cell configuration for a cellular telephone network 10 in which the present invention may be implemented. The cellular telephone network 10 operates in accordance with one of a number of known air interface types including, for example, a digital time division multiple access (TDMA) protocol. In a TDMA cellular telephone network, for example, each cell 12 operates with an assigned set of transmission frequencies selected from one or more available hyperbands. The set of frequencies assigned to each cell 12 includes frequencies supporting both at least one control channel and a plurality of traffic channels, with the control and traffic channels operable in either or both an analog and/or a digital mode. Sets of assigned frequencies are different for adjacent cells 12, and such sets are not repeated for use by other cells except for those cells that are far enough away from each other to minimize the likelihood of adjacent or co-channel interference.

North American cellular communications have historically been implemented solely in the 800 MHZ Cellular hyperband. The most recent evolution in cellular communications services involves the adoption of three additional hyperbands for use in handling mobile and personal communications. Of these additional hyperbands, only the Personal Communication Services (PCS) hyperband in the 1900 MHZ frequency range has been completely defined. The network 10 illustrated in FIG. 1 supports operation in either or both the Cellular hyperband and the PCS hyperband, as well as any future defined hyperbands, in connection with the implementation of the present invention in accordance with any air interface protocol type.

In the network 10, a base station 14 is provided for each of the cells 12. The base stations 14 engage in simultaneous communications with plural mobile stations 16 operating roughly within the area of the associated cell 12. The control channel assigned to each cell 12 is used to carry system control signals between the base station 14 and proximately located mobile stations 16, and also to assist in the network with mobile station cell reselection. Such control signals include call originations, page signals, page response signals, location registration signals, traffic channel assignments, maintenance instructions, and cell selection or re-selection instructions. The traffic channels provided in each cell 12 are used to carry subscriber voice or data communications between the base station 14 and proximately located mobile stations 16 and also to assist in the hand-off operation.

The base stations 14 are illustrated as being positioned at or near the center of each of the cells 12. However, depending on geography and other known factors, the base stations 14 may instead be located at or near the periphery of, or otherwise away from the centers of, each of the cells 12. In such instances, the base stations 14 may broadcast and communicate with mobile stations 16 located within the cells 12 using directional rather than omni-directional antennas. Each one of the base stations 14 includes a transmitter, a receiver, and a base station controller (none shown) connected to an antenna (also not shown) in a manner and with a configuration well known in the art.

The base stations 14 further communicate via signaling links and voice trunks 22 with a central control station, commonly referred to as a mobile switching center 18, which functions to control operation of the network 10. The mobile switching centers 18 are interconnected with each other and to the public switched telephone network (PSTN) 20 by the signaling links and voice trunks 22. The mobile switching centers 18 operate to selectively connect subscriber voice and data communications to the mobile stations 16 through its base stations 14. Thus, the mobile switching centers 18 control system operation through and in response to the transmission of control signals over the control channels to set-up on the traffic channels calls that are either originated by or terminated at the mobile stations 16. The mobile switching centers 18 further control, through and in response to control and traffic channel transmissions, the hand-off of a subscriber communication from a traffic channel of one cell 12 to a traffic channel of another cell as the subscriber mobile station 16 roams throughout the cellular service area during an ongoing communication.

It is common within one overall cellular service area to have a plurality of system areas 32 (differentiated from each other by the fact that they have different system identifications (SIDs) and perhaps have different service providers). A boundary 34, passing between cells 12 along the border between two system areas 32, is shown in bold in FIG. 1 to delimit the physical extent of each of the illustrated system areas. In this illustrated example, it will be noted that the cells 12 within two system areas 32 are served by different mobile switching centers 18.

As the mobile stations 16 move within the service area of the network 10, instances arise where a mobile station passes between two cells 12 within a single system area 32, or from one cell in a first system area 32(1) to another cell in a second system area 32(2). In moving between the cells 12 in either case, the mobile stations 16, in conjunction with base station 14 information and orders exchanged with and between the mobile switching centers 18, have an opportunity through hand-off to change the base station through which cellular radio communications are being effectuated.

Figure 2A:
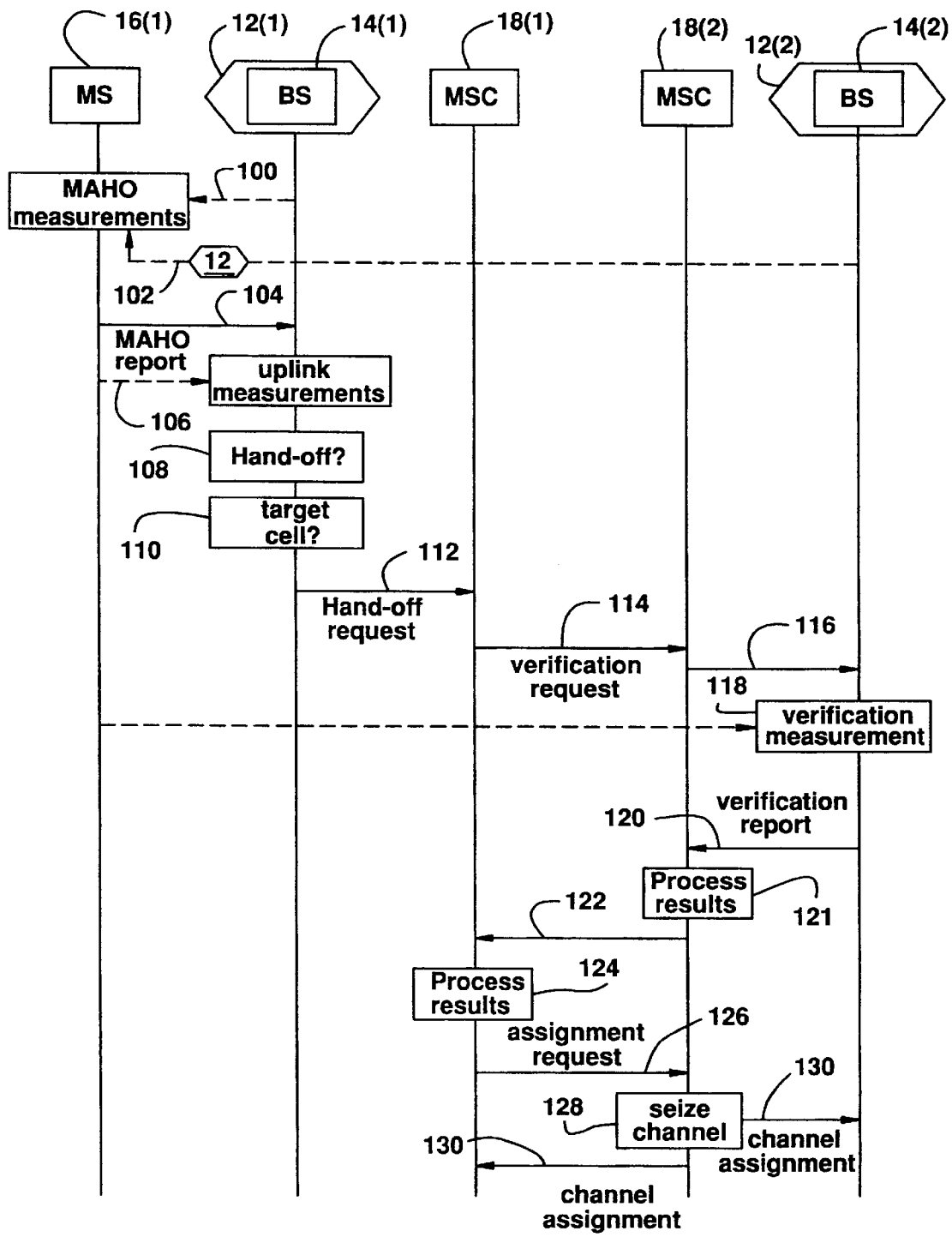
FIGS. 2A–2B are signal flow and network operation diagrams illustrating operation of the network of FIG. 1 in connection with the inter-exchange hand-off of a mobile station from a cell within a first system area to a cell within a second system area.
Figure 2B:
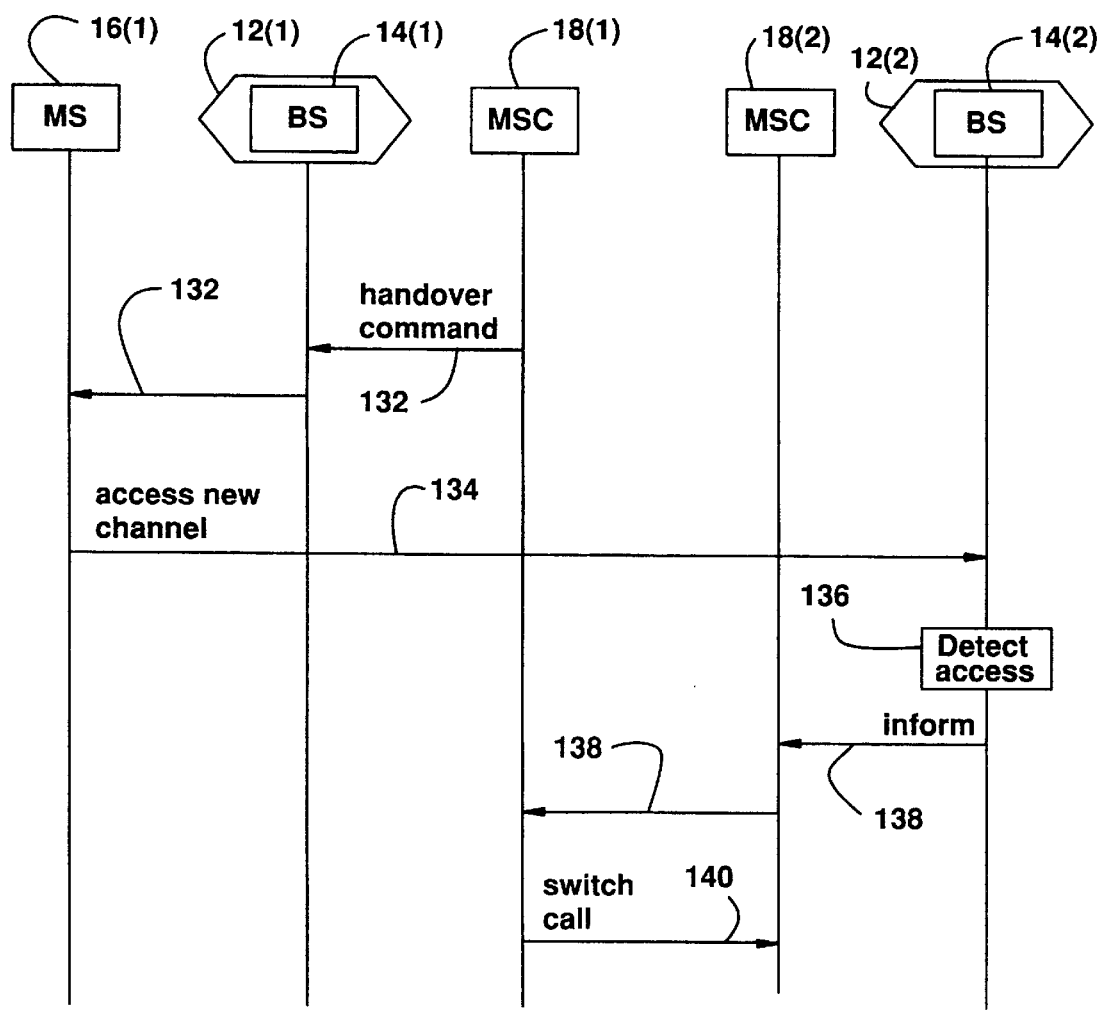

Reference is now made in combination to FIGS. 1 and 2A–2B wherein FIGS. 2A–2B are signal flow and network operation diagrams illustrating operation of the network 10 of FIG. 1 in connection with the inter-exchange hand-off of a mobile station 16(1) from a cell 12(1) within a first system area 32(1) to a cell 12(2) within a second system area 32(2). The mobile station 16(1), operating if capable in accordance with known mobile assisted hand-off (MAHO) principles, periodically makes downlink signal strength measurements 100 on the traffic channel (of cell 12(1)) that is currently being used, and also periodically makes downlink signal strength measurements 102 on the control channels of network identified cells 12, including cell 12(2) in the second system area 32(2), which neighbor the cell 12(1). These signal strength measurements are reported 104 to the base station 14(1) for the currently serving cell 12(1). The base station 14(1) concurrently makes uplink signal strength measurements 106 on the traffic channel that is currently being used by the mobile station 16(1).

The base station 14(1) processes the mobile station 16(1) reported 104 downlink signal strength measurements (100 and 102), if available, and the base station made uplink signal strength measurements (106) to determine first whether a hand-off is necessary (action 108) and second, if yes, to which cell or cells (candidates) the hand-off could and/or should preferably occur (action 110). The process performed by the base station 14(1) for action 110 involves the evaluation of the downlink signal strength measurements 100 in connection with certain hand-off related parameters for the candidate cells comprising: minimum signal strength required for hand-off to a cell (SSMIN); and maximum allowed base station power setting (PSVB). These SSMIN and PSVB parameters are typically set by system operators for each cell within their given system area 32. Historically, the SSMIN and PSVB parameters for the cells 12 in one system area 32 which are located along the border boundary 34 have been provided to the system operator for a neighboring system area 32 for manual input into each mobile switching center 18. Following manual input, these parameters are made available for processing use during inter-exchange hand-off evaluations. In this example, the parameters set by the system operator for target cell 12(2) in the second system area 32(2) must be provided to and considered by the first system area 32(1) during the evaluation of the downlink signal strength measurements.

Continuing with the present example, it is assumed that the base station 14(1) determines 108 from deteriorating measured uplink and/or downlink signal strengths that a hand-off is necessary. It is further assumed that an identification 110 is made of cell 12(2) in system area 32(2) as the preferred candidate (target) cell for hand-off. Accordingly, in this instance, the base station 14(1) favorably evaluated the signal strength measurements in view of the SSMIN and PSVB parameters for the target cell 12(2) of system area 32(2). A request 112 for hand-off including information comprising an identification of the currently serving cell 12(1), the traffic channel being used for communication with mobile station 16(1) in cell 12(1), and the target cell 12(2) for hand-off, is then sent by the base station 14(1) to the serving mobile switching center 18(1). A hand-off if approved in this instance would comprise an inter-exchange hand-off because the target cell 12(2) is served by a mobile switching center 18(2) (serving system area 32(2)) different from the mobile switching center 18(1) serving the current cell 12(1) (serving system area 32(1)). The foregoing description is only an example of the procedure used in making the determination to institute a hand-off. It will, of course, be understood that more than one target cell 12 may be identified by the process of action 110 for further hand-off consideration.

The currently serving mobile switching center 18(1) then signals 114 the mobile switching center 18(2) associated with the target cell 12(2) requesting verification of base station 14(2) communications capability with the mobile station 16(1). It is understood that multiple signals 114 may be sent if more than one target cell 12 has been identified for further hand-off consideration. The signal 114, similar to the request 112 sent by the base station 14(1), includes information comprising an identification of the currently serving cell 12(1) and the traffic channel being used for communication with mobile station 16(1) in cell 12(1). Responsive thereto, the mobile switching center 18(2) identifies the cells defined for the serving cell 12(1), and then signals 116 the base station 14(2) for the target cell 12(2) to make a verifying signal strength measurement (action 118) on the traffic channel currently being used by the mobile station 16(1) in the currently serving cell 12(1).

The base station 14(2) then reports 120 the results of the verification signal strength measurement to the mobile switching center 18(2). An evaluation of the verification signal strength measurement is then made (action 121) by the mobile switching center 18(2) to confirm the locating of the mobile station in view of expected signal strengths. This evaluation is made in connection with certain hand-off related parameters for the currently serving cell 12(1) comprising: power setting used on measurement channel (PSMB); and maximum power level at voice channel (PLVM). These PSMB and PLVM parameters are typically set by system operators for each cell within a given system area 32. Historically, the PSMB and PLVM parameters for the cells 12 in one system area 32 which are located along the border boundary 34 have been provided to the system operator for a neighboring system area 32 for manual input to each mobile switching center 18. Following manual input, these parameters are made available for processing use during inter-exchange hand-off evaluations. In this example, the parameters set by the system operator for serving cell 12(1) in the first system area 32(1) must be provided to and considered by the second system area 32(2) during the evaluation of the verification signal strength measurements. After the evaluation, the mobile switching center 18(2) forwards 122 the results of the verification measurement back to the mobile switching center 18(1). The results are then processed (action 124) by the mobile switching center 18(1) to determine whether a hand-off to target cell 12(2) should be made. This determination of action 124 again involves the evaluation of each reported verification signal strength measurement by the mobile switching center 18(2) in connection with the PSMB and PLVM parameters for the currently serving cell 12(1).

If the determination is affirmative with respect to the target cell 12(2), and if no other target cell is identified as a better choice, the mobile switching center 18(1) signals 126 the mobile switching center 18(2) requesting assignment (and reservation) of a traffic channel for hand-off to the target cell 12(2). A traffic channel is seized (action 128), and then both the base station 14(2) and mobile switching center 18(1) are informed 130 of the assignment by the mobile switching center 18(2) of the traffic channel in the target cell 12(2). The mobile switching center 18(1) then signals 132 the mobile station 16(1) via the base station 14(1) for the currently serving cell 12(1) with a handover command directing the mobile station to switch to the assigned traffic channel in the target cell 12(2). The mobile station 16(1) then tunes to and accesses 134 the assigned traffic channel. When the base station 14(2) detects the mobile station access (action 136), the mobile switching centers 18(1) and 18(2) are informed 138, and the call is switched 140 to the mobile switching center 18(2) for further handling to complete the hand-off procedure.

Figure 3:
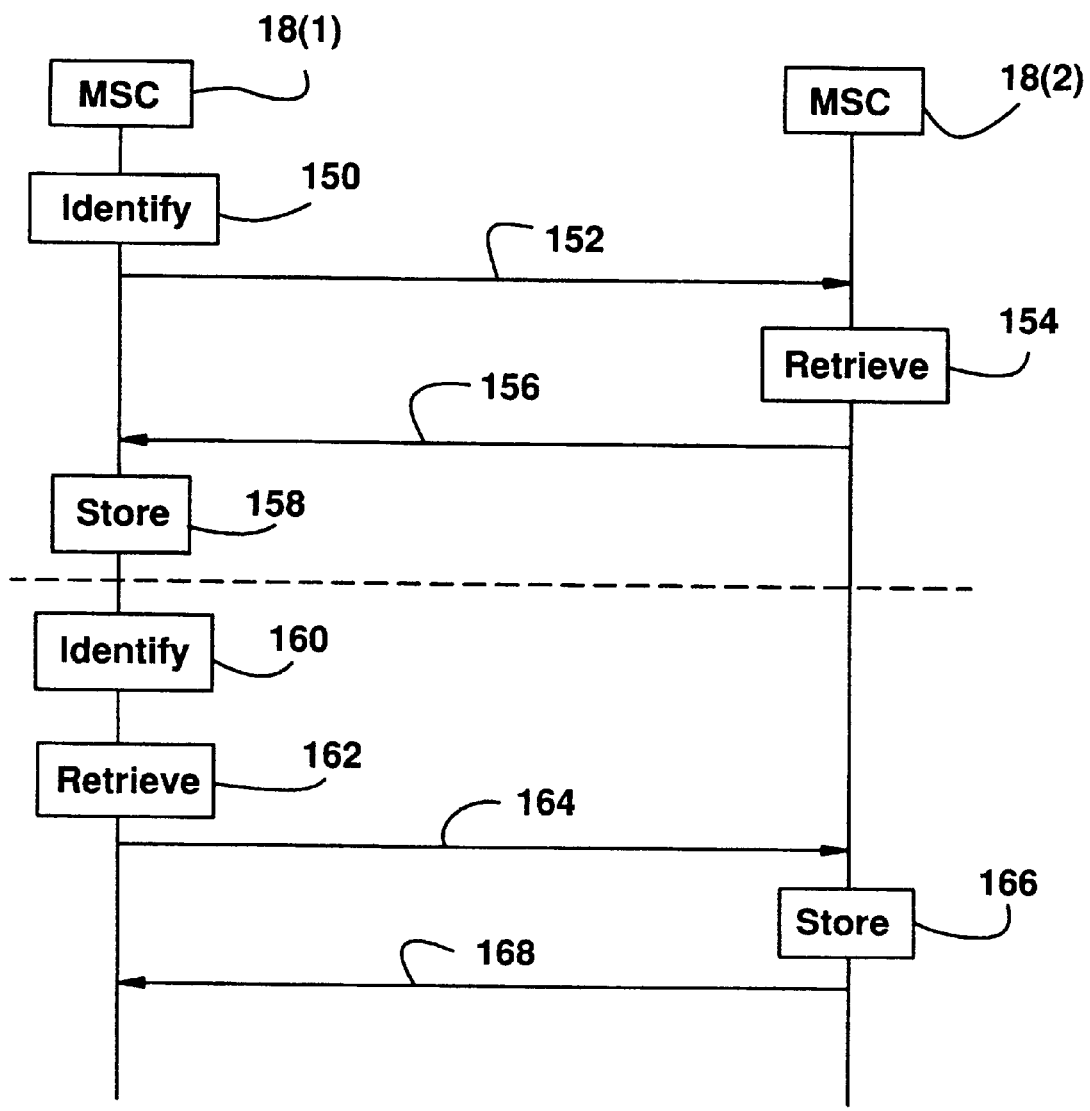
FIG. 3 is a signal flow and network operation diagram illustrating operation of the network of FIG. 1 in connection with the automated inter-exchange passing of hand-off related parameters.

In the context of inter-exchange hand-off, FIGS. 2A–2B illustrate that certain hand-off related parameters, namely the minimum signal strength required for hand-off to a cell (SSMIN), maximum allowed base station power setting (PSVB), power setting used on measurement channel (PSMB), and maximum power level at voice channel (PLVM), which are set by system operators for each cell within a given system area, must also be provided to the system operators of neighboring system areas for processing use in connection with the making of inter-exchange hand-off evaluations and determinations. Historically, these parameters have been provided to other system operators for manual input into their networks. Reference is now made to FIG. 3 wherein there is shown a signal flow and network operation diagram illustrating operation of the network of FIG. 1 in connection with the automated passing of hand-off related parameters between system areas.

In accordance with a first embodiment of the present invention, the hand-off related parameters are passed between mobile switching centers 18 at the request of a mobile switching center. Referring specifically to the top of FIG. 3, a first mobile switching center 18(1) within a first system area 32(1) identifies in action 150 a need for the hand-off related parameters assigned to certain border cells by a system operator for a second system area 32(2). This need may arise because no prior inter-exchange hand-off evaluation and determination with respect to border cells of the second system area 32(2) had either previously or recently occurred. Alternatively, this need may arise triggered to effectuate a periodic updating of the hand-off related parameters. In any case, the first mobile switching center 18(1) generates a parameter request invoke message 152 for transmission to a second mobile switching center 18(2) within the second system area 32(2) serving the border cells at issue. The invoke message 152 preferably identifies not only the particular border cells for which hand-off related parameters are needed, but also which specific hand-off related parameters are being requested. The hand-off related parameters for all border cells have previously been entered into the second mobile switching center 18(2) by the system operator for the second system area 32(2). Responsive to receipt of the invoke message 152, the second mobile switching center 18(2) retrieves the requested hand-off related parameters from storage (action 154), and generates a responsive parameter request return result message 156 for transmission back to the first mobile switching center 18(1). Responsive to receipt of the return result message 156, the first mobile switching center 18(1) stores the transmitted hand-off related parameters (action 158).

In accordance with a second embodiment of the present invention, the hand-off related parameters are passed between mobile switching centers 18 at the direction of a mobile switching center. Referring specifically to the bottom of FIG. 3, a first mobile switching center 18(1) within a first system area 32(1) identifies in action 160 a need to send the hand-off related parameters assigned by its system operator to certain border cells to the system operator for a second system area 32(2). This need may arise during initial network configuration. Alternatively, this need may arise triggered to effectuate a periodic updating of the hand-off related parameters. The hand-off related parameters for all border cells have previously been entered into the first mobile switching center 18(1) by the system operator for the first system area 32(1). Responsive to the identified need, the first mobile switching center 18(1) retrieves the requested hand-off related parameters from storage (action 162), and generates a parameter directive invoke message 164 for transmission to a second mobile switching center 18(2) within the second system area 32(2). Responsive to receipt of the invoke message 164, the second mobile switching center 18(2) stores the transmitted hand-off related parameters (action 166), and generates a responsive parameter directive return result message 168 for transmission back to the first mobile switching center 18(1) confirming receipt of the hand-off related parameters.

The delivered hand-off related parameters are then utilized by the first mobile switching center 18(1) in connection with making hand-off evaluations and determinations in the manner described in FIGS. 2A–2B. For example, the minimum signal strength required for hand-off to a cell (SSMIN), and maximum allowed base station power setting (PSVB) parameters set by the system operator for border cells with the second system area 32(2) are utilized by the first system area, and in particular a serving base station, during the evaluation of mobile station made MAHO signal strength measurements. Also, the power setting used on measurement channel (PSMB), and maximum power level at voice channel (PLVM) parameters set by the system operator for border cells with the second system area 32(2) are utilized by the first system area, and in particular a mobile switching center serving a target cell, during the evaluation of base station made verification signal strength measurements.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cellular telephone network, comprising:

a first system area having a plurality of first cells including a first border cell, the first border cell having assigned thereto certain hand-off related parameters;

a second system area, bordering the first system area, the second system area having a plurality of second cells including a second border cell, the second border cell also having assigned thereto certain hand-off related parameters;

a mobile station roaming between the first border cell in the first system area and the second border cell in the second system area;

means for signaling messages between the first and second system areas, the messages transmitting the certain hand-off related parameters assigned to the first border cell to the second system area and transmitting the certain hand-off related parameters assigned to the second border cell to the first system area, the transmitted parameters for subsequent first and second system area use in connection with the evaluation of an as yet to be initiated future inter-system hand-off request with respect to the roaming mobile station; and means for storing the certain hand-off related parameters received by each one of the first and second system areas, wherein the stored certain hand-off related parameters are evaluated by each one of the first and second system areas in connection with future inter-system hand-off requests.

2. The network as in claim 1 wherein the first system area includes a first mobile switching center and the second system area includes a second mobile switching center, and wherein the messages transmitting the certain hand-off related parameters are transmitted between the first and second mobile switching centers.

3. The network as in claim 2 wherein the means for signaling messages comprises:

means in the first mobile switching center for transmitting a request to the second mobile switching center for the certain hand-off related parameters assigned to the second border cell; and means in the second mobile switching center responsive to the request for retrieving and transmitting second border cell hand-off related parameters to the first mobile switching center.

4. The network as in claim 2 wherein the means for signaling messages comprises means in the first mobile switching center for transmitting on its own initiative first border cell hand-off related parameters to the second mobile switching center.

5. The network as in claim 1 wherein the hand-off related parameters comprise:

minimum signal strength required for hand-off to a cell (SSMIN);

maximum allowed base station power setting (PSVB);

power setting used on measurement channel (PSMB); and maximum power level at voice channel (PLVM).

6. In a cellular telephone network including:

a first system area; and a second system area, bordering the first system area, the second system area having a plurality of cells including a border cell, the border cell having assigned thereto certain hand-off related parameters;

a method for passing hand-off related parameters between the first system area and the second system area comprising the steps of:

signaling from the first system area to the second system area with a request for the second system area to provide the certain hand-off related parameters assigned to the border cell;

extracting the certain hand-off related parameters assigned to the border cell in response to the request;

signaling from the second system area to the first system area with a response transmitting the extracted hand-off related parameters assigned to the border cell, the transmitted parameters for subsequent first system area use in connection with the evaluation of an as yet to be initiated future inter-system hand-off request received from the second system area; and storing the certain hand-off related parameters received by the first system area, wherein the stored certain hand-off related parameters are evaluated by the first system area in connection with future second system area initiated inter-system hand-off requests.

7. The method as in claim 6 wherein the hand-off related parameters comprise:

minimum signal strength required for hand-off to a cell (SSMIN);

maximum allowed base station power setting (PSVB);

power setting used on measurement channel (PSMB); and maximum power level at voice channel (PLVM).

8. In a cellular telephone network including:

a first system area; and a second system area, bordering the first system area, the second system area having a plurality of cells including a border cell, the border cell having assigned thereto certain hand-off related parameters;

a method for passing hand-off related parameters between the first system area and the second system area comprising the steps of:

extracting the certain hand-off related parameters assigned to the border cell;

signaling from the second system area to the first system area with a message transmitting the extracted certain hand-off related parameters assigned to the border cell, the transmitted parameters for subsequent first system area use in connection with the evaluation of an as yet to be initiated future inter-system hand-off request received from the second system area; and storing the certain hand-off related parameters received by the first system area, wherein the stored certain hand-off related parameters are evaluated by the first system area in connection with future second system area initiated inter-system hand-off requests.

9. The method as in claim 8 wherein the hand-off related parameters comprise:

minimum signal strength required for hand-off to a cell (SSMIN);

maximum allowed base station power setting (PSVB);

power setting used on measurement channel (PSMB); and maximum power level at voice channel (PLVM).

* * * * *